(12) United States Patent
Mellor et al.

(10) Patent No.: US 10,265,931 B2
(45) Date of Patent: Apr. 23, 2019

(54) LAMINATED GLAZING

(71) Applicant: PILKINGTON GROUP LIMITED, Lancashire (GB)

(72) Inventors: Leigh Francis Mellor, Merseyside (GB); Mark Andrew Chamberlain, Lancashire (GB)

(73) Assignee: PILKINGTON GROUP LIMITED, Nr. Ormskirk, Lancashire (GB)

( * ) Notice: Subject to any disclaimer, the term of this patent is extended or adjusted under 35 U.S.C. 154(b) by 114 days.

(21) Appl. No.: 15/117,938

(22) PCT Filed: Feb. 18, 2015

(86) PCT No.: PCT/GB2015/050470
§ 371 (c)(1),
(2) Date: Aug. 10, 2016

(87) PCT Pub. No.: WO2015/124926
PCT Pub. Date: Aug. 27, 2015

(65) Prior Publication Data
US 2016/0347036 A1 Dec. 1, 2016

(30) Foreign Application Priority Data
Feb. 18, 2014 (GB) .................................. 1402815.3

(51) Int. Cl.
*H05B 3/08* (2006.01)
*H05B 3/06* (2006.01)
(Continued)

(52) U.S. Cl.
CPC .. *B32B 17/10036* (2013.01); *B32B 17/10174* (2013.01); *B32B 17/10293* (2013.01);
(Continued)

(58) Field of Classification Search
CPC ................ B32B 17/10; B32B 2367/00; B32B 17/10036; B32B 17/10174;
(Continued)

(56) References Cited

U.S. PATENT DOCUMENTS 3,612,745 A * 10/1971 Warren .................. B32B 17/10
174/254
5,153,062 A 10/1992 Grolig et al.
(Continued)

FOREIGN PATENT DOCUMENTS

WO    WO 01/51279 A2    7/2001
WO    WO 2004/082934 A1    9/2004
(Continued)

OTHER PUBLICATIONS

International Search Report (PCT/ISA/210) dated Jun. 11, 2015, by the European Patent Office as the International Searching Authority for International Application No. PCT/GB2015/050470.
(Continued)

*Primary Examiner* — Sang Y Paik
(74) *Attorney, Agent, or Firm* — Buchanan Ingersoll & Rooney PC

(57) ABSTRACT

The invention relates to a laminated glazing comprising first and second plies of glazing material, a carrier film arranged between the first and second plies of glazing material carrying an electrically conductive coating, a busbar arranged in contact with the electrically conductive coating. An edge of the carrier film is spaced inwardly from an edge of the glazing. The busbar and the carrier film are arranged to define an anchor portion suitable for anchoring the carrier film, the anchor portion comprising a region of the carrier film extending outwardly from an edge of the busbar. The anchor portion anchors the film to avoid the formation of
(Continued)

wrinkles in the carrier film. Avoidance of wrinkles results in more uniform heating and elimination of hotspots.

12 Claims, 3 Drawing Sheets

(51) Int. Cl.
*B32B 17/10* (2006.01)
*B32B 37/14* (2006.01)

(52) U.S. Cl.
CPC ........ *B32B 17/10761* (2013.01); *B32B 37/14* (2013.01); *B32B 2605/006* (2013.01)

(58) Field of Classification Search
CPC ........ B32B 17/10293; B32B 17/10761; B32B 2605/006; B32B 37/14
USPC .......................... 219/202, 203, 522, 538–544
See application file for complete search history.

(56) References Cited

U.S. PATENT DOCUMENTS

| | | | |
|---|---|---|---|
| 6,242,088 | B1 | 6/2001 | Costa |
| 7,132,625 | B2 * | 11/2006 | Voeltzel ............ B32B 17/10036 219/203 |
| 2003/0111160 | A1 | 6/2003 | Bolognese et al. |
| 2010/0285280 | A1 | 11/2010 | Yonekura et al. |
| 2011/0097572 | A1 | 4/2011 | Yonekura et al. |
| 2012/0152930 | A1 | 6/2012 | Chamberlain |

FOREIGN PATENT DOCUMENTS

| | | |
|---|---|---|
| WO | 2006010698 A1 | 2/2006 |
| WO | 2009060941 A1 | 5/2009 |

OTHER PUBLICATIONS

Written Opinion (PCT/ISA/237) dated Jun. 11, 2015, by the European Patent Office as the International Searching Authority for International Application No. PCT/GB2015/050470.

* cited by examiner

LAMINATED GLAZING

BACKGROUND OF THE INVENTION

The present invention relates to a laminated glazing comprising a carrier film.

Laminated glazings comprising a carrier film are known. Typically the carrier film is between two plies of bonding resin, which are arranged between two plies of glazing material. The carrier film is typically made of an electrically insulating thermoplastic material and carries an electrically conductive coating. The electrically conductive coating is used to provide infrared reflection, heatability or an antenna function. In the case of a heated coated glazing, an external circuit is connected to the electrically conductive coating by means of a busbar, so as to achieve a required distribution of heating current.

Methods of manufacturing such laminated glazings, including the steps of shaping, degassing and using pressure and heat to join the constituents of the laminated glazings to one another, are known in the art.

A known problem with laminated glazings containing a carrier film is optical distortion due to wrinkles in the carrier film. Wrinkles are formed during manufacture of curved laminated glazing, where a carrier film is incapable of conforming to a radius of curvature of the curved laminated glazing. Wrinkles are visible as optical distortion in reflected light.

U.S. Pat. No. 6,242,088 (Pilkington/Costa) solves the problem of wrinkle formation in a carrier film by providing a bi-axially stretched carrier film, coextensive with plies of glazing material and having a heat shrinkage co-efficient in a particular range. US20110097572 (Central/Yonekura) prevents wrinkles related to heat shrinkage by forming a two-layer or three-layer laminated film containing a carrier film, which is coextensive with plies of glazing material, as a step in a manufacturing process.

WO0151279 (SIV/Bolognese) solves the problem of wrinkle formation by reducing the size of the carrier film, so the outer edge of the carrier film lies within the outer edge of two plies of glazing material, i.e. the carrier film is no longer coextensive with the plies of glazing material. In preferred embodiments, a distance between an edge of the carrier film and an edge of the plies of glazing material is at least 10 mm and is substantially constant around the entire circumference of the laminated glazing.

It is an object of the present invention to provide a laminated glazing comprising a carrier film, further comprising an alternative means for preventing wrinkle formation in the carrier film.

SUMMARY OF THE INVENTION

According to a first aspect of the present invention, a laminated glazing is provided comprising the features set out in claim 1 attached hereto.

The present invention offers an alternative means for preventing wrinkle formation in a laminated glazing comprising a carrier film, by providing an anchor portion of the carrier film, suitable for anchoring the carrier film, said anchor portion comprising a region of the carrier film extending outwardly from an edge of a busbar.

A benefit of providing a carrier film extension which serves as an anchor for the carrier film is that the carrier film is restricted from sliding during a laminating process. Such sliding is believed to be a cause of wrinkle formation. In a laminated glazing comprising a busbar, an anchor portion of the carrier film prevents the carrier film from sliding under the busbar during lamination, and thus prevents wrinkle formation local to the busbar.

Surprisingly, extension of a carrier film towards an edge of a laminated glazing prevents wrinkle formation, whereas it had been expected that additional carrier film would lead to more creasing and wrinkle formation. The inventors have found that wrinkle formation is prevented in a region by providing an anchor portion, comprising a region of the carrier film extending outwardly from an edge of the busbar, in that region whereas the prior art teaches that a distance between the edge of the carrier film and the edge of the laminated glazing should be increased uniformly.

The inventors have discovered that providing an anchor portion comprising a region of the carrier film extending outwardly from an edge of the busbar is a means of reducing or completely eliminating wrinkle formation due to the busbar.

Preferably the laminated glazing further comprises first and second plies of bonding resin, arranged between the first and second plies of glazing material, wherein the carrier film is arranged between the first and second plies of bonding resin.

Preferably the anchor portion has a substantially triangular shape.

In a preferred embodiment, the laminated glazing further comprises a collinear region wherein the edge of the busbar and the edge of the carrier film are collinear.

Preferably the laminated glazing further comprises a divergence point between the collinear region and a region in which the edge of the busbar and the edge of the carrier film diverge.

In another embodiment a laminated glazing further comprises an auxiliary anchor portion arranged to provide a force at least partly orthogonal to a force provided by the anchor portion.

Preferably a distance between the edge of the busbar and the edge of the carrier film is in the range 1 mm to 30 mm.

More preferably the distance between the edge of the busbar and the edge of the carrier film is in the range 10 mm to 20 mm.

Preferably the busbar is pre-formed by stamping.

In a preferred embodiment the busbar has a thickness in the range 50 um to 150 um.

Preferably the busbar has a width in the range 1 mm to 15 mm.

Preferably a distance between the edge of the carrier film and the edge of the first ply of glazing material is in the range 5 mm to 20 mm.

According to a second aspect of the present invention, a method for manufacturing a laminated glazing is provided comprising the steps set out in claim 13 attached hereto.

Preferably the method for manufacturing a laminated glazing further comprises the steps:
  providing a first ply of bonding resin and applying it to the first ply of glazing material
  applying the carrier film to the first ply of bonding resin, such that the carrier film is between the first ply of bonding resin and the electrically conductive coating Preferably the method for manufacturing a laminated glazing further comprises the steps:
  providing an obscuration band on a ply of glazing material
  arranging the busbar so as to be obscured by the obscuration band.

The inventors have found that by arranging the busbar and the carrier film to define an anchor portion comprising a region of the carrier film extending outwardly from an edge of the busbar, the method of manufacture has the surprising advantage that wrinkle formation is so reduced that the busbar may be arranged even closer to the edge of the laminated glazing than was possible in the prior art. Therefore an obscuration band provided to hide the busbar from view can be smaller.

BRIEF DESCRIPTION OF THE DRAWINGS

The invention will now be described by means of non-limiting examples with reference to the attached figures.

DETAILED DESCRIPTION OF THE INVENTION

Figure 1:
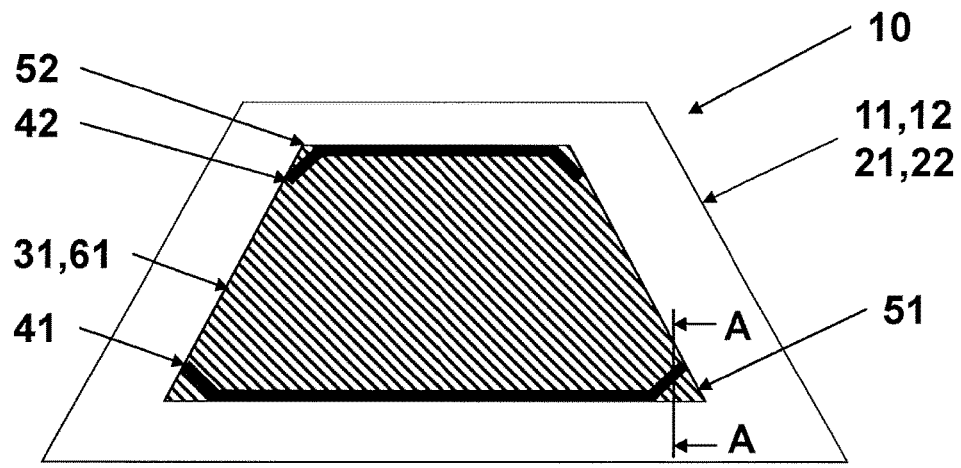
FIG. 1 shows a laminated glazing according to the invention.

FIG. 1 shows a laminated glazing 10 according to the invention. A windscreen is shown for ease of illustration of the invention but it will be understood by the reader that the invention is not limited to such windscreens and includes side windows, rear windows and roof windows.

The laminated glazing 10 comprises first and second plies of glazing material 11, 12. The plies of glazing material may be annealed glass or toughened glass. The glass composition is typically soda-lime glass, made by the float process as known in the art.

A carrier film 31 is arranged between the first and second plies of glazing material 11, 12. Typically the carrier film 31 is made of polyethylene terephthalate, i.e. PET. Typical PET film thickness is 30 um to 70 um. Preferably the thickness is 50 um.

Figure 2:
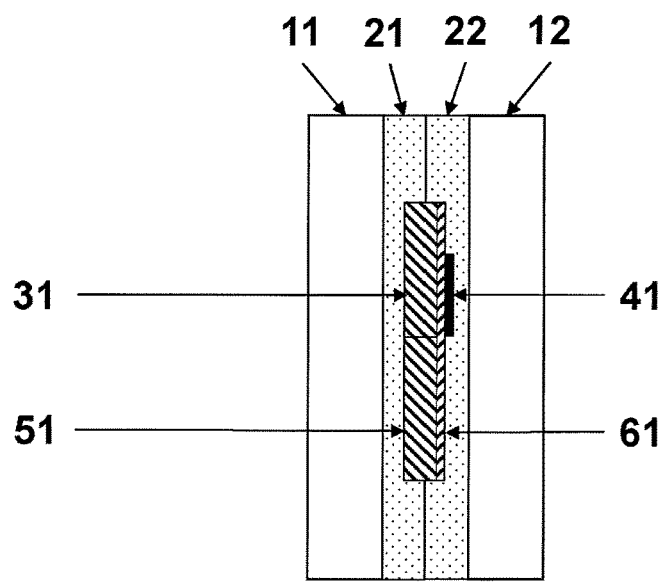
FIG. 2 shows a laminated glazing according to the invention in cross-section.

The carrier film 31 carries an electrically conductive layer 61, as shown in FIG. 2. The electrically conductive layer may comprise a dielectric material $In_2O_3$ and a layer of silver and a further layer of $In_2O_3$.

A busbar 41 is arranged in electrical contact with the electrically conductive coating 61. Typically the busbar has a low resistance so that a voltage applied from an external circuit is substantially the same along the length of the busbar. The busbar is typically made of a metal foil, preferably copper because of its low resistivity.

The busbar thickness is in the range 50 um to 150 um. A preferred thickness is 100 um.

The busbar width is in the range 1 mm to 15 mm. For the busbars in contact with the electrically conductive coating 61 a preferred width is 10 mm. For the busbars not in contact with the electrically conductive coating 61, also known as busbar extensions or earth busbars, a preferred width is 4 mm.

The busbar 41 and the carrier film 31 are arranged to define an anchor portion 51. The anchor portion 51 is part of the carrier film 31 which extends outwardly from an edge of the busbar 41 to the edge of the carrier film 31.

The anchor portion 51 is suitable for anchoring the carrier film, i.e. it must provide sufficient friction force to prevent the carrier film 31 from sliding during the lamination process, which would cause wrinkles. It has been found that wrinkle formation is prevented if the distance between the edge of the busbar and the edge of the carrier film is in the range 1 mm to 30 mm.

Arranging the busbar 41 and the carrier film 31 to provide an anchor portion 51 is done whilst ensuring that the edge of the carrier film 31 is spaced inwardly from an edge of the first ply of glazing material 11, i.e. whilst maintaining a distance between the edge of the carrier film 31 and the edge of the first ply of glazing material 11. This distance, known as the set-back, is advantageous to prevent wrinkle formation. It is essential to the present invention that the carrier film 31 is not co-extensive with the first ply of glazing material 11, so as to avoid wrinkle formation as disclosed in WO0151279. The distance is preferably in the range 5 mm to 20 mm.

A second busbar 42 and the carrier film 31 are arranged at the top of the laminated glazing 10 to define a second anchor portion 52, to avoid wrinkles local to the second busbar 42.

FIG. 2 shows a cross-section on the line A-A of the laminated glazing of FIG. 1. The cross-section shows a carrier film 31 carrying an electrically conductive coating 61, arranged between first and second plies of bonding resin 21, 22, which are arranged between first and second plies of glazing material 11, 12. Busbar 41 and carrier film 31 are arranged to define an anchor portion 51, which extends from an edge of the busbar 41 to an edge of the carrier film 31. The anchor portion 51 is an extension of the carrier film 31 under the busbar 41 and therefore carries an electrically conductive coating 61. An advantage of the invention is that removal of the electrically conductive coating 61 from the anchor portion is unnecessary, thus saving a step in the manufacturing process.

Figure 3:
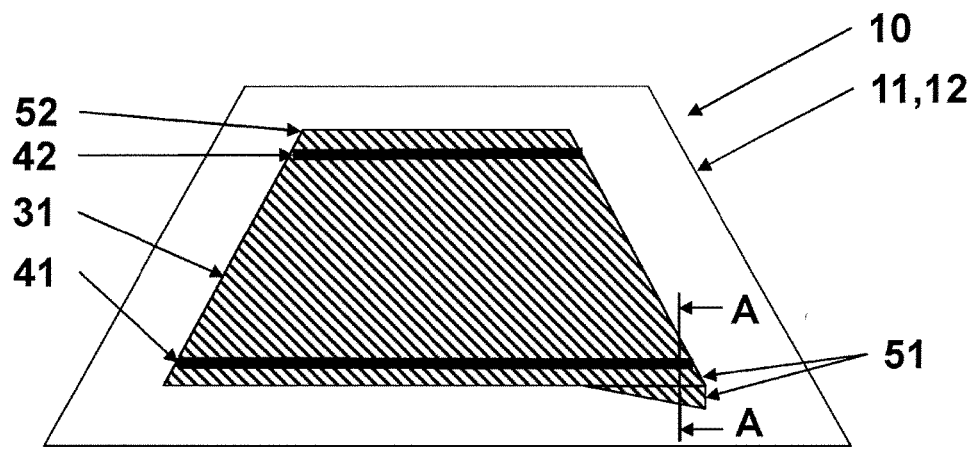
FIG. 3 shows a laminated glazing with an anchor portion and a corner anchor portion.

FIG. 3 shows a laminated glazing according to the invention, with references as in FIG. 1. Busbars 41, 42 and carrier film 31 are arranged to define anchor portions 51, 52 which extend outwardly from an edge of each busbar suitable for anchoring the carrier film. Second anchor portion 52 is parallel with the busbar 42 and parallel with an edge of the first ply of glazing material 11. Anchor portion 51 comprises a part which is parallel with the busbar 41 and parallel with an edge of the first ply of glazing material 11, and further comprises a part, called a corner anchor portion, which extends in the direction of the edge of the first ply of glazing material 11.

Figure 4:
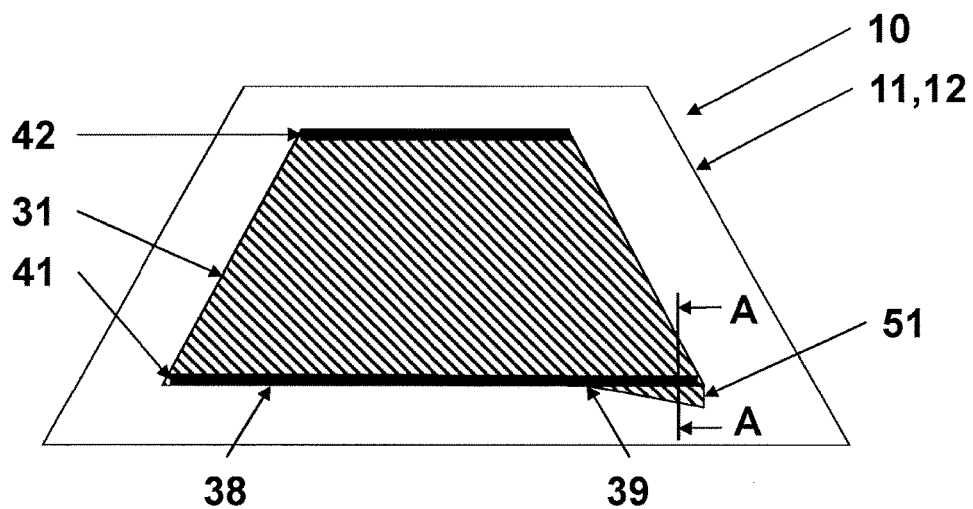
FIG. 4 shows a laminated glazing with a corner anchor portion only.

FIG. 4 shows a laminated glazing according to the invention, with references as in FIG. 1. Busbar 41 and carrier film 31 are arranged to define a collinear region 38 wherein the edge of the busbar 41 and the edge of the carrier film 31 are collinear. The collinear region 38 is not an anchor portion. A divergence point 39 at the end of the collinear region 38 defines a region in which the edge of the busbar 41 and the edge of the carrier film 31 diverge. The divergent region is a corner anchor portion 51. Advantageously the corner anchor portion 51 may have a substantially triangular shape. A triangular shape is easy to manufacture and provides a distribution of forces in the carrier film 31 which prevent the formation of wrinkles. Second busbar 42 and carrier film 31 are arranged such that there is no anchor portion, as a comparative example.

Figure 5:
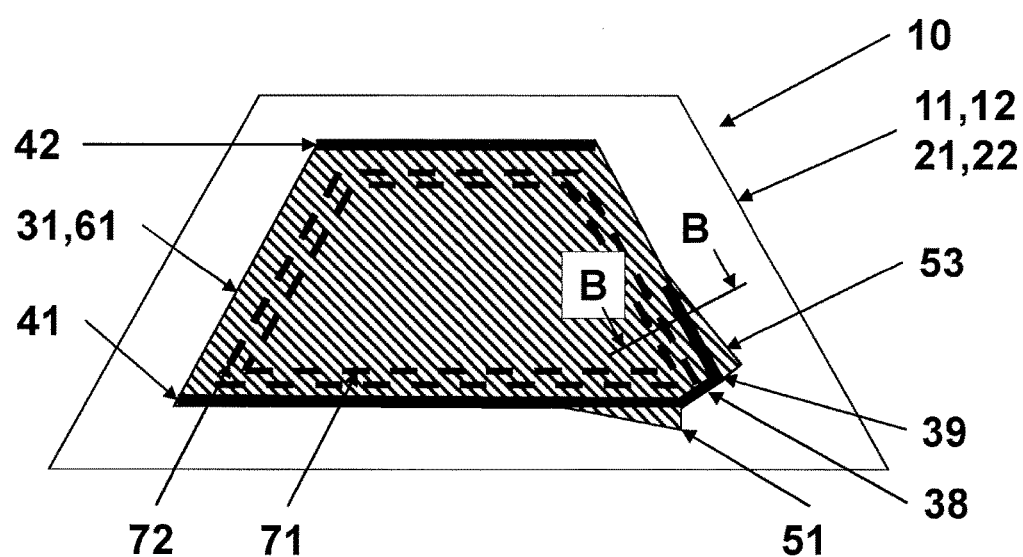
FIG. 5 shows a laminated glazing with an anchor portion and auxiliary anchor portion.

FIG. 5 shows a laminated glazing according to the invention, in which busbar 41 has a curved portion at a corner of the laminated glazing. During manufacture of such a laminated glazing, forces at least partly orthogonal to each other may be exerted on the carrier film 31 inside the corner, causing wrinkles. To counteract such forces according to this embodiment of the invention, busbar 41 and carrier film 31 are arranged to define an anchor portion 51 and an auxiliary anchor portion 53. Anchor portions 51, 53 are arranged to provide forces at least partly orthogonal to each other, such that the carrier film 31 is anchored in two dimensions and wrinkle formation is prevented.

FIG. 5 also shows first and second obscuration bands 71, 72, which extend from outer edges of the first and second plies of glazing material 11, 12 inwardly towards a viewing area of the laminated glazing 10. Obscuration bands are known in the art as opaque areas to hide features of the laminated glazing such as busbars, wrinkles and adhesive. Obscuration bands are typically ceramic ink applied to a surface of a ply of glazing material. According to the present invention, the size of the viewing area may be maximised by arranging inner edges of first and second obscuration bands 71, 72 closer to the periphery of the laminated glazing 10, because masking wrinkles is not required.

Figure 6:
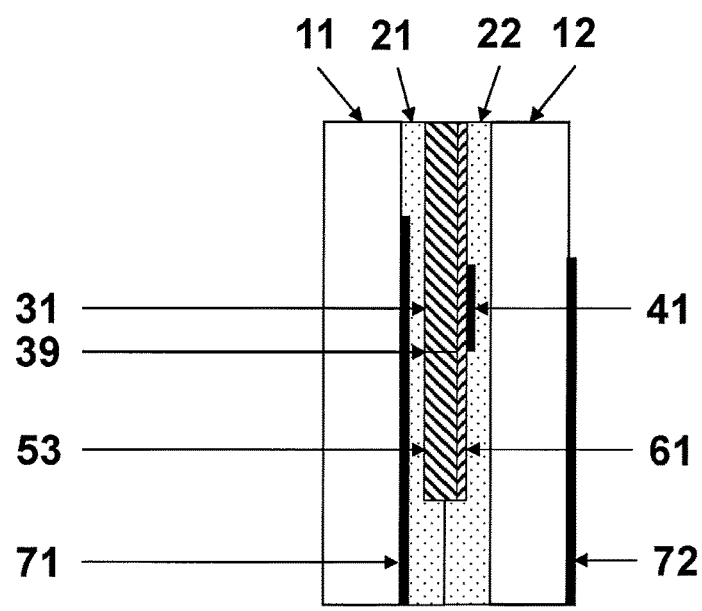
FIG. 6 shows a laminated glazing with an auxiliary anchor portion and an obscuration band in cross-section.

FIG. 6 shows a cross-section on the line B-B of the laminated glazing of FIG. 5. The cross-section shows a carrier film 31 carrying an electrically conductive coating 61 and having an auxiliary anchor portion 53. In this embodiment of the invention, a first obscuration band 71 is on a surface of the first ply of glazing material 11 in contact with the first ply of bonding resin 21, i.e. on surface 2 of the laminated glazing. A second obscuration band 72 is on a surface of the second ply of glazing material facing the inside of a vehicle, i.e. on surface 4 of the laminated glazing. An inner edge of the second obscuration band 72 is level with the busbar 41.

EXAMPLES OF THE INVENTION

An example of the invention was made as shown in FIG. 1 and FIG. 2 and a comparative example was made, without the anchor portions 51, 52. In the comparative example, busbars and carrier film were arranged to be collinear, as busbar 42 in FIG. 4.

The example and the comparative example were made as follows. First and second plies of glazing material 11, 12 were provided. First and second obscuration bands 71, 72 were provided on the first and second plies of glazing material 11, 12. A first ply of bonding resin 21 was applied to the first ply of glazing material 11. A carrier film 31 was provided having an electrically conductive coating 61 and was applied to the first ply of bonding resin, such that the carrier film 31 was between the first ply of bonding resin 21 and the electrically conductive coating 61.

First and second busbars 41, 42 were provided on a second ply of bonding resin 22 and arranged in electrical contact with the electrically conductive coating 61 by laying the second ply of bonding resin 22 on the first ply of bonding resin 21. The second ply of glazing material 12 was laid on top of the second ply of bonding resin 22, so that the carrier film 31 was between the first and second plies of glazing material 11, 12.

The first ply of bonding resin 21 was polyvinyl butyral, i.e. PVB, having thickness 0.38 mm. The second ply of bonding resin 22 was a wedged acoustic PVB, suitable for sound insulation and a Head-Up-Display, i.e. HUD, having thickness 0.76 mm.

Busbars 41, 42 were of thickness 100 um and width 10 mm. Width of the busbars 41, 42 was selected to maximise contact area on the electrically conductive coating 61. Busbars 41, 42 were pre-formed by stamping, so as to reduce wrinkling which may be caused by making busbars in-situ from a roll of metal foil. The pre-formed busbars were stamped from copper foil having a layer of adhesive to make a self-adhesive strip. The self-adhesive strip had thickness 50 um. The pre-formed busbars were bonded to the second ply of bonding resin 22 using the self-adhesive strip. The busbars 41, 42 were arranged so as to be obscured by the obscuration bands 71, 72.

The carrier film 31 was made of polyethylene terephthalate, i.e. PET, having thickness 50 um. The carrier film 31 was spaced inwardly from an edge of the first ply of glazing material 11, so as to avoid wrinkle formation at the edge.

The electrically conductive coating 61 was a standard solar control sputtered coating, which served as a heating element. The laminated glazing required rapid defrost performance, so was designed to be powered at approximately 44 V DC to give a power density of approximately 900 W/m2.

In the comparative example, busbars 41, 42 were arranged to be collinear with respective opposite edges of the carrier film 31, i.e. without anchor portions.

In the example according to the invention, busbars 41, 42 and the carrier film 31 were arranged to define anchor portions 51, 52 extending outwardly from an edge of each busbar, suitable for anchoring the carrier film. Each busbar 41, 42 also had a collinear region 38, wherein the edge of the busbar and the edge of the carrier film were collinear, and a divergence point 39 between the collinear region 38 and a region in which the edge of the busbar and the edge of the carrier film diverge, i.e. the anchor portion. Each anchor portion had substantially triangular shape.

Both the example and the comparative example were laminated by methods known in the art. In a first step a vacuum ring was applied to the edges of the first and second plies of glazing material, and a vacuum applied for degassing first and second plies of bonding resin and the carrier film at approximately room temperature.

In a second step, still under vacuum, the first and second plies of glazing material were heated in the range 120° C. to 180° C., such that the first and second plies of bonding resin melted sufficiently to bond with the first and second plies of glazing material and the carrier film.

In a third step, the first and second plies of glazing material and the carrier film were laminated together in an autoclave in the pressure range 6 bar to 14 bar and in the temperature range 120° C. to 150° C.

The example and the comparative example were tested as follows. Voltage was applied between the busbars 41, 42 and electrical current was allowed to flow for a test period of five minutes. At the end of the test period, temperature distribution was recorded using a thermal imaging camera.

In the comparative example, hot spots as high as 125° C. were detected behind the obscuration bands due to hidden wrinkles in the PET carrier film at the corners of the laminated glazing. In the example according to the invention the maximum temperature in the corners was less than 95° C. Wrinkling was significantly reduced due to the provision of anchor portions. Therefore there was better electrical contact between the busbars and the electrically conductive coating, and hotspots were avoided.

The invention claimed is:
1. A laminated glazing comprising:
   first and second plies of glazing material;
   a carrier film arranged between the first and second plies of glazing material, carrying an electrically conductive coating, the carrier film having a thickness of 30 to 70 µm and being made of polyethylene terephthalate;

a busbar arranged in electrical contact with the electrically conductive coating;

wherein an edge of the carrier film is spaced inwardly from an edge of the first ply of glazing material and a distance between the edge of the carrier film and the edge of the first ply of glazing material is in the range 5 mm to 20 mm; and the busbar and the carrier film are arranged to define an anchor portion suitable for anchoring the carrier film to prevent the carrier film from sliding during a lamination process, said anchor portion comprising a region of the carrier film extending outwardly from an edge of the busbar, wherein a distance between the edge of the busbar and the edge of the carrier film is in the range 1 mm to 30 mm and the anchor portion has a substantially triangular shape.

2. A laminated glazing according to claim 1, further comprising first and second plies of bonding resin, arranged between the first and second plies of glazing material, wherein the carrier film is arranged between the first and second plies of bonding resin.

3. A laminated glazing according to claim 1, further comprising a collinear region wherein the edge of the busbar and the edge of the carrier film are collinear.

4. A laminated glazing according to claim 3, further comprising a divergence point between the collinear region and a region in which the edge of the busbar and the edge of the carrier film diverge.

5. A laminated glazing according to claim 1, further comprising an auxiliary anchor portion extending outwardly from an edge of the busbar and arranged to provide a force at least partly orthogonal to a force provided by the anchor portion.

6. A laminated glazing according to claim 1, wherein the distance between the edge of the busbar and the edge of the carrier film is in the range 10 mm to 20 mm.

7. A laminated glazing according to claim 1, wherein the busbar is pre-formed by stamping.

8. A laminated glazing according to claim 1, wherein the busbar has a thickness in the range 50 um to 150 um.

9. A laminated glazing according to claim 1, wherein the busbar has a width in the range 1 mm to 15 mm.

10. A method for manufacturing a laminated glazing, comprising:

providing first and second plies of glazing material;

providing a carrier film, arranged between the first and second plies of glazing material and carrying an electrically conductive coating, the carrier film having a thickness of 30 to 70 μm and being made of polyethylene terephthalate;

providing a busbar, arranged in electrical contact with the electrically conductive coating;

spacing an edge of the carrier film inwardly from an edge of the first ply of glazing material with a distance between the edge of the carrier film and the edge of the first ply of glazing material being in the range 5 mm to 20 mm; and arranging the busbar and the carrier film to define an anchor portion suitable for anchoring the carrier film, said anchor portion comprising a region of the carrier film extending outwardly from an edge of the busbar, wherein a distance between the edge of the busbar and the edge of the carrier film is in the range 1 mm to 30 mm and the anchor portion has a substantially triangular shape.

11. A method for manufacturing a laminated glazing according to claim 10, further comprising:

providing a first ply of bonding resin and applying it to the first ply of glazing material; and applying the carrier film to the first ply of bonding resin, such that the carrier film is between the first ply of bonding resin and the electrically conductive coating.

12. A method for manufacturing a laminated glazing according to claim 10, further comprising:

providing an obscuration band on a ply of glazing material; and arranging the busbar so as to be obscured by the obscuration band.

* * * * *